3,579,522
PROCESS FOR THE PRODUCTION OF POLYESTER
VARNISH SOLUTIONS
Otto Bendszus and Clemens Niehaus, Krefeld, and Manfred Patheiger, Krefeld-Uerdingen, Germany, assignors to Farbenfabriken Bayer Aktiengesellschaft, Leverkusen, Germany
No Drawing. Filed Jan. 21, 1969, Ser. No. 792,849
Claims priority, application Germany, Feb. 5, 1968,
P 16 44 816.1
Int. Cl. C08g *51/22*
U.S. Cl. 260—29.1    10 Claims

ABSTRACT OF THE DISCLOSURE

A varnish solution comprising a polyester of an $\alpha,\beta$-unsaturated dicarboxylic acid dissolved in a copolymerizable ethylenically unsaturated monomer, said solution having a thixotropy $\Delta F$ of at least about 10% and containing a liquid organopolysiloxane.

---

The invention relates to a process for the production of so-called "solvent-free" polyester varnish solutions, i.e. of solutions of unsaturated polyesters in polymerisable, ethylenic-unsaturated, monomeric compounds, preferably styrene, containing a liquid organo-polysiloxane with improved processing properties.

It is generally known to add organo-polysiloxanes as levelling and deaerating agents to varnish solutions, including polyester varnish solutions. However, most organo-polysiloxanes are compatible with the varnish solutions only in very small amounts. According to U.S. patent specifications No. 2,467,858 and No. 2,523,065, the limit of compatibility of an important group of polysiloxanes lies at not more than about 0.01 percent by weight, usually even only at about 0.001 percent by weight. It also depends on the composition of the varnish solutions and, in particular, on any adsorbing pigments contained therein. If the content of such polysiloxanes in the varnish solutions is kept appreciably below the limit of compatibility, then the flow-promoting effect is only poor, while an even moderate overdosage leads to cloudiness of the varnish solutions in storage and to extrudation of the polysiloxanes from the varnishes. Moreover, the processing of such varnish solutions encounters difficulties, even when they have only been stored for a short time. When the varnish solutions are applied by means of pouring machine, the pouring curtain breaks, and dimples are formed. Even if the polysiloxane is only added immediately before the working up of the varnish solutions, these deficiencies cannot be completely overcome. If, on the other hand, two-component spray devices are used, where the varnish solution and the hardener solution containing the polysiloxane are mixed only in the spray jet, then it is found that the distribution of the polysiloxane in the varnish solution is no longer sufficiently even, and this leads again to the formation of dimples.

In German patent specifications Nos. 1,092,585 and 1,111,320 there are described special organo-polysiloxanes which are appreciably more compatible with varnish solutions, including, in particular, polyester varnish solutions, and can therefore be added to the varnish solutions in substantial amounts. However, these compatible polysiloxanes are less effective than the incompatible compounds with regard to the deaeration of the varnish coatings as well as with regard to the flow promotion. When added to polyester varnish solutions having a content of waxes or paraffins, they also interfere with the formation of a protective skin.

The invention, then, has as its object a process for the production of "solvent-free" polyester varnish solutions with a content of a liquid "incompatible" organo-polysiloxane (solubility in the varnish solutions <0.01 percent by weight), which makes it possible to obviate the disadvantages, as described above, of the addition of such incompatible polysiloxanes in amounts lying above the limit of compatibility. The process is characterized in that the organo-polysiloxane is added, preferably in the form of a solution, in an amount to form about 0.001, preferably from about 0.01, to about 0.5 percent by weight to a thixotropic polyester solution with a thixotropy $\Delta F$ of at least about 10% and, if desired, the solution is subsequently diluted with polysiloxane-free polyester solutions; the polysiloxane content of the whole mixture should amount to from about 0.001, preferably from about 0.01, to about 0.5 percent by weight.

The symbol $\Delta F$ denotes the percentage proportions of the hysteresis surface in a $\tau D$ diagram (D=shearing gradient, $\tau$=shearing strain), referred to the surface enclosed by the gel curve and the D-axis in the range from D=0 to 200 sec.$^{-1}$.

The term "solvent-free" polyester varnish solutions in the meaning of the invention comprises, as is customary and as has been indicated above, solutions of unsaturated polyesters drived from $\alpha,\beta$-unsaturated dicarboxylic acids, in copolymerisable, monomeric, ethylenic-unsaturated compounds, preferably styrene. It is particularly advantageous to use polyester solutions with a known content of a small amount of wax or paraffin, since the formation of skin to prevent the access of air, which is caused by this additive, is not impaired by the polysiloxane. However, it is also possible to use the so-called air-hardening polyester solutions, that is to say solutions of polyesters which, in addition to the $\alpha,\beta$-unsaturated dicarboxylic acid esters, contain radicals of $\beta,\gamma$-unsaturated ethers (cf. e.g. U.S. patent specifications No. 2,467,838 and No. 2,523,065).

"Incompatible" organopolysiloxanes are primarily those which substantially consist of chains of dialkyl, e.g. dimethyl, siloxane members, that is to say of bifunctional units (see e.g. German patent specification No. 849,464). As has already been mentioned, the limit of their solubility in the polyester solutions lies at not more than about 0.01 percent by weight. It is expedient to add such a polysiloxane in the form of a solution, for example, in toluene, xylene or also styrene, to the thixotropic polyester solution.

The essential characteristic of the process consists in that the polyester solution which is admixed with the incompatible polysiloxane, has been rendered thixotropic and that the thixotropy is higher than the minimum value of about 10% mentioned above, preferably higher than about 20%. The manner in which the thixotropy has been achieved is practically of no importance. In principle, all known thixotropy agents can be used, for example, polyisocyanates or certain polymeric amines according to German patent specification No. 1,182,816, or certain polyurethanes according to German patent specification No. 1,217,611, or certain polyester amides according to German patent specification No. 1,106,015, or cyclohexylamides of higher fatty acids according to the published data of Belgian Pat. No. 693,580.

As has already been mentioned, thixotropic polyester solution containing the polysiloxane can be diluted, if desired, with polysiloxane-free, non-thixotropic or thixotropic polyester solutions, viz up to a proportion of about 1:50, but the polysiloxane content of the whole mixture should again amount to between about 0.001, preferably, about 0.01 and about 0.5 percent by weight, in order to ensure the intended effect of the polysiloxane additive.

The finished polyester varnish solution or mixtures finally contain, as is known, a catalyst, for example, diacyl peroxide or hydroperoxide, preferably ketone hydroperoxide, and an accelerator which is harmonized with the catalyst, for example, a tertiary aromatic amine or a soluble heavy metal salt, preferably a cobalt salt, respectively. The catalyst and the accelerator can be distributed in known manner between two different polyester solutions or between an active primer and the polyester solution.

Moreover, the varnish solutions may contain other conventional additives, such as plasticisers, dyestuffs, pigments, and the like.

Application of the varnish solutions to the substrates to be coated can be carried out by all known methods, that is to say according to the various spray processes, such as the active priming process, the permixed application and the two-component spray process, as well as according to the known pouring processes, such as again the active primer process, the sandwich process, the reversal process and the two-head process.

EXAMPLE 1

To a solution of 65 parts by weight of an unsaturated polyester from 62 moles maleic acid anhydride, 38 moles phthalic acid anhydride and 102.5 moles 1,2-propyleneglycol with the acid number 54, stabilised by the addition of 0.01 part hydroquinone, in 35 parts by weight styrene there are added 0.5 parts by weight 2,6-toluylene diisocyanate with good stirring. When the reaction is completed, the thixotropy $\Delta F$ of the mixture amounts to about 32%. There are then added 0.025 parts by weight of a commercial dimethyl polysiloxane in the form of a 10% solution in styrene, a further 20 parts by weight of styrene, 0.1 part by weight of a paraffin of melting point 51 to 53° C. dissolved in toluene and, finally, 0.04 part by weight of cobalt in the form of a 20% cobalt naphthenate solution in toluene.

This varnish solution is applied in amounts of 100, 200 and 500 g./sq. m. to wood plates which were previously coated with 80 g./sq. m. of an active primer consisting of 100 parts by weight of a 20% nitrocellulose solution in ethyl acetate of medium viscosity, 35 parts by weight butyl acetate, 65 parts by weight ethyl acetate, and 20 parts by weight of cyclohexanone peroxide, 90% in water, and dried at room temperature for 2 hours. The polyester varnish solution can be applied immediately after its preparation or also after storage for up to 6 months, according to the spray process as well as by means of a pouring outfit. In the last-mentioned case, the curtain flows faultlessly. No formation of dimples can be observed in either process.

EXAMPLE 2

The procedure of Example 1 is followed, but with the use of a 65% styrene solution of an unsaturated polyester prepared from 162 parts by weight maleic acid anhydride, 141 parts by weight phthalic acid anhydride and 195 parts by weight 1,2-propane-diol with the acid number 46. This solution is mixed at 80° C. with part by weight behenic acid cyclohexylamide, instead of with diisocyanate. The thixotropy $\Delta F$ of the cooled solution amounts to about 20%. To this solution there are then added 0.01 part by weight of a commercial dimethyl polysiloxane in the form of a 10% solution in styrene, followed by a further 20 parts by weight styrene, 0.1 part by weight of the paraffin dissolved in toluene, and, finally, 0.04 part by weight of cobalt in the form of the cobalt naphthenate solution, always with good stirirng. The working up of this varnish solution according to the spraying as well as the pouring process proceeds faultlessly.

EXAMPLE 3

The procedure of Example 1 is followed, using as varnish solution, a mixture consisting of 5 parts by weight of the thixotropic polyester solution described in Example 1, without the addition of paraffin or cobalt naphthenate but with a content of 0.5 percent by weight dimethyl polysiloxane, and of 95 parts by weight of a 54% by weight styrene solution of an unsaturated polyester from 62 moles maleic acid anhydride, 38 moles phthalic acid anhydride, and 102.5 moles 1,2-propylene glycol with the acid number 51, which has been stabilised by the addition of 0.01 part by weight hydroquinone, with a content of 0.1 part by weight of a paraffin of melting point 52–54° C. and 0.04 part by weight of cobalt in the form of cobalt naphthenate. Also this mixed varnish solution which is virtually no longer thixotropic can be worked up faultlessly in the fresh state or after 6 months' storage, according to the spraying as well as to the pouring process.

EXAMPLE 4

The procedure of Example 3 is followed, but with the use of a mixture which consists of 30 parts by weight of the thixotropic solution containing the dimethyl polysiloxane and 70 parts by weight of the non-thixotropic solution containing paraffin and cobalt. Also this mixed varnish solution can be faultlessly worked up.

EXAMPLE 5

The procedure of Example 3 is followed, but with the use of a mixture of 25 parts by weight of the solution used in Example 2, which is thixotropic but free from paraffin and cobalt and has a content of 0.5 percent by weight of dimethyl polysiloxane, and 75 parts by weight of the non-thixotropic polyester solution containing paraffin and cobalt. Also this mixed varnish solution can be faultlessly worked up.

EXAMPLE 6

The procedure of Example 5 is followed, but with the use of a mixture of 20 parts by weight of the thixotropic polyester solution with a content of only 0.1 part by weight dimethyl polysiloxane, and 80 parts by weight of the non-thixotropic polyester solution containing paraffin and cobalt. 2 percent by weight of highly dispersed silicic acid are added to this mixture. Also this mixed varnish solution can be faultlessly worked up.

EXAMPLE 7

The procedure of Example 3 is followed, using as non-thixotropic polyester solution a paraffin-free, cobalt naphthenate-containing, 54% by weight styrene solution of an unsaturated polyester from 490 parts by weight maleic acid anhydride, 740 parts by weight phthalic acid anhydride, 610 parts by weight ethylene glycol, and 535 parts by weight of trimethylolpropane diallyl ether with the acid number 31, which has been established by the addition of 0.02 percent by weight hydroquinone. Also this varnish mixture can be faultlessly worked up. Since the non-thixotropic polyester solution is a solution of a polyester containing allyl ether radicals, the varnish layers harden, even without the addition of wax or paraffin, at room temperature within a few hours tackfree also on the surface to form films which are insoluble in solvents.

EXAMPLE 8

All of the varnish solutions described in Examples 1–7 can be faultlessly worked up with a single- or two-component spray gun, instead of by the active primer process. For this purpose, there are used 100 parts by weight of the varnish solutions described in the preceding examples and 10 parts by weight of a hardener solution consisting of 2.5 parts by weight of a 50% cyclohexanone peroxide paste in a plasticizer and 7.5 parts by weight ethyl acetate.

We claim:
1. A process for producing a vanrish solution which comprises admixing (a) a solution of an unsurted polyester consisting substantially of a polycondensation product of an $\alpha,\beta$-unsaturated dicarboxylic acid and a polyalcohol in a copolymerizable ethylenically unsaturated monomer having a thixotropy $\Delta F$ of at least about 10% with (b) a liquid organo polysiloxane whose solubility in said varnish solution is less than 0.01% by weight in an amount of from about 0.01 to about 0.5% by weight, based on the weight of said varnish solution.

2. The process of claim 1 wherein the thixotropy$\Delta$F of said varnish solution is at least about 20%.

3. The process of claim 1 wherein resulting varnish solution is diluted with a polysiloxane-free polyester solution, while maintaining the polysiloxane content thereof in an amount of at least about 0.01% by weight.

4. The process of claim 1 wherein said copolymerizable ethylenically unsaturated monomer is styrene.

5. The process of claim 1 wherein the thixotropy$\Delta$F of the polyester solution is obtained by the addition of a polyisocyanate.

6. The process of claim 1 wherein the thixotropy$\Delta$F of the polyester solution is obtained by the addition of a polymeric amine.

7. The process of claim 1 wherein the thixotropy$\Delta$F of the polyester solution is obtained by the addition of a polyester amide.

8. The process of claim 1 wherein the thixotropy$\Delta$F of the polyester solution is obtained by the addition of a polyurethane.

9. The process of claim 1 wherein the thixotropy$\Delta$F of the polyester solution is obtained by the addition of a cyclohexylamide of a higher fatty acid.

10. The process of claim 1 wherein the organo-polysiloxane is dimethylpolysiloxane.

References Cited
UNITED STATES PATENTS

| | | | |
|---|---|---|---|
| 2,467,858 | 4/1949 | Sage | 260—19(N)X |
| 2,523,065 | 9/1950 | Sage | 260—19(N) |
| 2,851,437 | 9/1958 | Petropoulos | 260—824X |
| 3,077,424 | 2/1963 | Maker et al. | 260—40X |
| 3,210,273 | 10/1965 | Taulli | 260—40X |
| 3,484,401 | 12/1969 | Rudolph et al. | 260—40X |

MORRIS LIEBMAN, Primary Examiner

L. T. JACOBS, Assistant Examiner

U.S. Cl. X.R.

260—824